(12) United States Patent
Hammerschick

(10) Patent No.: US 8,460,416 B2
(45) Date of Patent: Jun. 11, 2013

(54) OIL SEPARATING DEVICE, ESPECIALLY FOR CRANKCASE VENTING IN AN INTERNAL COMBUSTION ENGINE

(75) Inventor: Jörg Hammerschick, Asperg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 395 days.

(21) Appl. No.: 12/738,093

(22) PCT Filed: Aug. 25, 2008

(86) PCT No.: PCT/EP2008/061090
§ 371 (c)(1),
(2), (4) Date: Apr. 20, 2010

(87) PCT Pub. No.: WO2009/049947
PCT Pub. Date: Apr. 23, 2009

(65) Prior Publication Data
US 2010/0218682 A1    Sep. 2, 2010

(30) Foreign Application Priority Data

Oct. 16, 2007    (DE) .......................... 10 2007 049 725

(51) Int. Cl.
*B01D 50/00*    (2006.01)
*B01D 45/08*    (2006.01)
*B01D 46/10*    (2006.01)
*A47L 9/16*    (2006.01)

(52) U.S. Cl.
CPC ............. *B01D 50/002* (2013.01); *B01D 45/08* (2013.01); *B01D 46/10* (2013.01); *A47L 9/1666* (2013.01); *Y10S 55/19* (2013.01)
USPC ................ 55/320; 55/321; 55/337; 55/385.3; 55/DIG. 19

(58) Field of Classification Search
CPC ..................................... B01D 50/002
USPC ................... 55/315, 337, 338, 342, 343, 344, 55/345, 346, 350.1, 355, 418, 419, DIG. 14, 55/DIG. 19, 320; 96/155, 156, 188, 189, 96/190; 123/41.86, 572
See application file for complete search history.

(56) References Cited

U.S. PATENT DOCUMENTS 3,978,671 A * 9/1976 Gonzalez .................... 60/605.3
5,429,101 A * 7/1995 Uebelhoer et al. ............ 123/572

(Continued)

FOREIGN PATENT DOCUMENTS

DE          10339249 A1      3/2005

OTHER PUBLICATIONS

PCT search report PCT/EP2008/061090.

(Continued)

*Primary Examiner* — Duane Smith
*Assistant Examiner* — Sonji Turner
(74) *Attorney, Agent, or Firm* — James Hasselbeck

(57) ABSTRACT

An oil separating device is provided with a first and a second separator element that are arranged parallel to one another and are positioned in a separate first and a second flow path, respectively. The oil/air stream to be cleaned is alternatingly introduced into the first flow path with the first separator element or into the second flow path provided with the second separator element.

10 Claims, 1 Drawing Sheet

U.S. PATENT DOCUMENTS

| | | | |
|---|---|---|---|
| 5,660,607 A | 8/1997 | Jokschas | |
| 5,669,366 A * | 9/1997 | Beach et al. | 123/572 |
| 6,279,555 B1 * | 8/2001 | Crowell et al. | 123/572 |
| 6,279,556 B1 * | 8/2001 | Busen et al. | 123/572 |
| 6,505,615 B2 * | 1/2003 | Pietschner | 123/572 |
| 6,684,864 B1 * | 2/2004 | Busen et al. | 123/572 |
| 7,011,690 B2 * | 3/2006 | Altvater et al. | 55/312 |
| 2002/0100465 A1 * | 8/2002 | Pietschner | 123/572 |
| 2003/0221398 A1 | 12/2003 | Trautmann | |
| 2004/0237484 A1 * | 12/2004 | Altvater et al. | 55/345 |
| 2007/0151215 A1 * | 7/2007 | Knittel et al. | 55/345 |
| 2010/0089345 A1 * | 4/2010 | Kim et al. | 123/41.86 |

OTHER PUBLICATIONS

EP Office Action of Nov. 12, 2010 on related EP application EP 08 803 205.7.

* cited by examiner

OIL SEPARATING DEVICE, ESPECIALLY FOR CRANKCASE VENTING IN AN INTERNAL COMBUSTION ENGINE

CROSS REFERENCE TO RELATED APPLICATIONS

This application is US National Stage Entry of international patent application no. PCT/EP2008/061090, filed Aug. 25, 2008 designating the United States of America, the entire disclosure of which is incorporated herein by reference. Priority is claimed based on Federal Republic of Germany patent application no. 10 2007 049725.5, filed Oct. 16, 2007.

TECHNICAL FIELD

The invention concerns an oil separating device, in particular for separating oil from a vented air/oil stream of an internal combustion engine.

PRIOR ART

DE 37 01 587 C1 discloses an oil separator that is used for crankcase venting in an internal combustion engine. The oil separator has in a housing an annular metal gauze package that is passed through by the oil/air mixture introduced into the housing and that retains larger oil particles. Subsequently, the pre-cleaned oil/air mixture is introduced into a cyclone separator in the housing interior in which, because of radial flow of the oil/air mixture, further oil particles may be precipitated along the wall of the cyclone. Subsequently, the cleaned air flow is guided out of the housing.

The metal gauze package can be used only for preseparation of larger oil particles; this, moreover, requires a relatively coarse configuration of the gauze because otherwise the fabric would clog with oil and passage would be impossible. The large-pore configuration of the fabric however limits the efficiency significantly.

DE 196 42 219 A1 also discloses an oil separating device with two separating units. In a housing of the oil separating device a preseparator is arranged that is configured as a coil with several coil turns wherein larger oil droplets are separated along the coil turns of the preseparator. Subsequently, the pre-cleaned oil/air mixture is introduced into an annular radially surrounding space in the housing which space is enveloped by a nonwoven fabric that is flowed through radially by the pre-cleaned mixture.

Even through in DE 196 42 219 A1 the nonwoven fabric is arranged downstream of the oil preseparator, there is still the risk that the nonwoven over the course of time will clog with oil droplets or soot entrained in the oil/air stream and that the efficiency decreases. Therefore, the nonwoven must be regularly serviced.

SUMMARY OF THE INVENTION

The invention has the object to increase with simple measures the efficiency and/or the service life of the oil separating device.

This object is solved according to the invention with the features of claim 1. The dependent claims provide expedient further developments.

The oil separating device according to the invention is preferably used for crankcase venting in internal combustion engines. The oil separating device comprises a first and a second separator element, wherein the separator elements are arranged parallel to one another and are positioned in separate first and second flow paths. The oil/air stream to be cleaned is introduced selectively into the first flow path containing the first separator element or into the second flow path containing the second separator element.

In this way it is possible for the first time to make, based on the current situation, a differentiation between different separator elements through which the oil/air stream to be cleaned is to be passed. This is advantageous because that one of the separator elements may be selected that is best matched to the actual composition of the oil/air mixture. It may be expedient, for example, to supply the oil/air mixture in situations with a high oil proportion or with large oil droplets to that one of the separator elements that is matched best for separating a larger oil proportion or larger oil droplets. In drive situations with more finely distributed oil droplets or a smaller oil proportion it is, on the other hand, expedient to select that one of the separator elements that is matched better to this ratio of oil and air.

Expediently, the separator elements have different filter actions, caused by a different construction. Basically, it is also possible to provide same or same-acting separator elements wherein the changeover from the first to the second separator elements is carried out as soon as the filtration action of the first separator element decreases and drops below a threshold value.

According to a preferred embodiment, the first separator element is embodied as a filter element, in particular as a nonwoven filter fabric and the second separator element is embodied as a cyclone, labyrinth, or impact separator. The filter element is suitable in particular for separating finer oil droplets, while the cyclone, labyrinth or impact separator is suited better for separation of larger oil droplets. Basically, both separator elements however are characterized by a simple constructive design.

A further advantage of the separate embodiment of the separator elements in separate flow paths resides in the simple servicing possibility. For servicing purposes, it is only required to change or clean a separator element in question in one of the flow paths while the second separator element may remain in its position in the flow path.

A further advantage resides in the simple configuration of filter element and cyclone or labyrinth or impact separator. The filter element, in particular in its embodiment as a nonwoven filter fabric, can be produced in a simple and inexpensive way and, after clogging with oil droplets, can be exchanged and replaced within a new filter element. The labyrinth, cyclone or impact separator is based on a simple mechanical separating action in which the oil droplets either by rotation of the oil/air mixture are carried outwardly and are deposited on an inner wall or impact axially or radially on an impact plate. Complex disk separators or electrostatic separators are in principle also possible but are not mandatory.

According to a further preferred embodiment, the first and the second flow paths branch off a common supply line wherein at the branch site a valve is arranged by means of which the introduction of the oil/air mass flow is controlled into the first or the second flow path. This valve, which is for example a solenoid valve, controls the supply into each flow path, wherein preferably an adjustment is possible in which the entire oil/air mass flow is introduced into the first flow path as well as an adjustment in which the entire oil/air mass flow is introduced into the second flow path. Advantageously, also intermediate positions are possible in which a partial mass flow is introduced into the first as well as into the second flow path to the respective separator elements, wherein the ratio of the partial mass flows is adjustable by the valve.

The adjustment of the valve is realized preferably by means of control signals of a governing unit or control unit and is carried out as a function of an actual state variable or operating parameter. This state variable or operating parameter is in particular a characteristic of the internal combustion engine or of a device of the internal combustion engine, preferably the actual load state of the internal combustion engine. Below a threshold value of the characteristic, the oil/air stream is supplied to the first separator element and above the threshold value to the second separator element. As mentioned above, it is also possible, depending on the actual value of the characteristic, to supply partial mass flows to the first as well as to the second separator element.

Downstream of the first and the second separator elements the flow paths preferably open again into a common flow passage, preferably into the intake manifold when used in an internal combustion engine.

BRIEF DESCRIPTION OF THE DRAWINGS

Further advantages and expedient embodiments may be taken from the additional claims, the figure description and the drawings. It is shown in:

In the Figures same components are identified with same reference numerals.

EMBODIMENT(S) OF THE INVENTION

Figure 1:
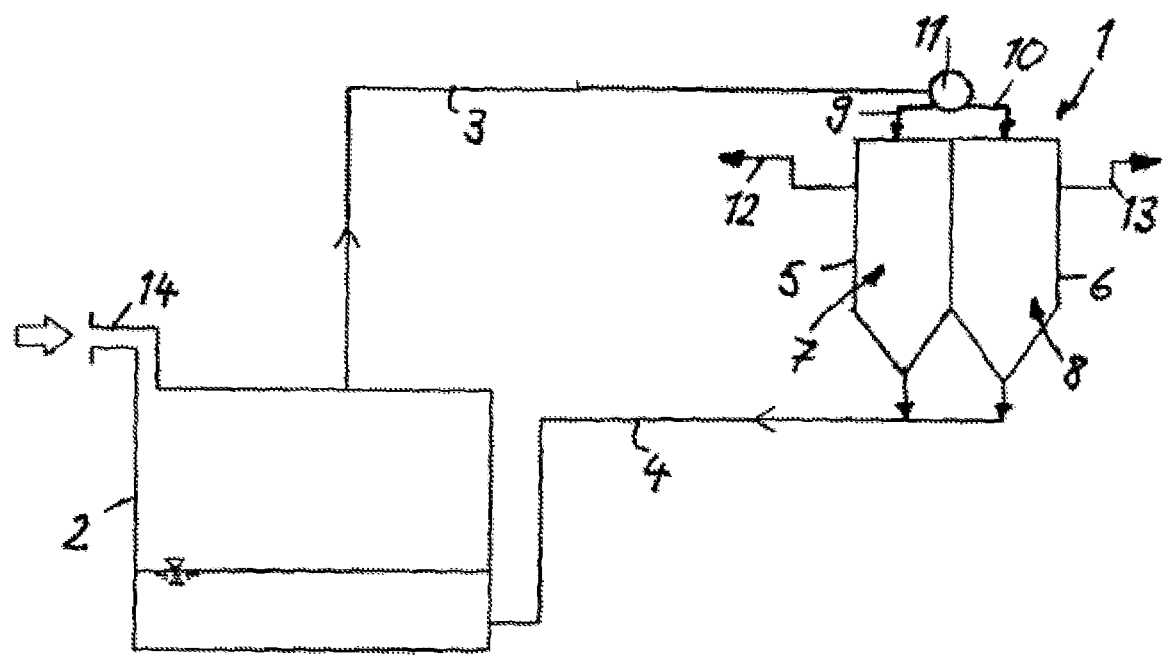
FIG. 1 an overview representation of an oil separating device that is used for crankcase venting in an internal combustion engine.

In FIG. 1 an oil separating device 1 for crankcase venting in an internal combustion engine is illustrated. The blow-by gases are introduced by means of an inlet socket 14 into the crankcase 2 of the internal combustion engine and are supplied by means of supply line 3 as an oil/air mixture to the oil separating device 1 for removing the oil proportions. The oil separating device 1 comprises two separately embodied and parallel arranged separators 5 and 6 each provided with a separator element 7 and 8. The separators 5 and 6 are positioned in separate flow paths 9, 10, respectively, that are connected by a valve 11 to the supply line 3. Depending on the position of the valve 11, the blow-by gases are supplied from the supply line 3 either into the first flow path 9 to the separator 5 or into the second flow path 10 into the second separator 6 or are distributed proportionally onto both separators.

In the separators 5 and 6 the oil particles are separated from the oil/air stream, collected and returned again into the crankcase 2 by means of discharge socket and a return line 4. The cleaned air stream is then removed through conduits 12 and 13 from the separators 5 and 6 and introduced, for example, into the intake manifold of the internal combustion engine.

Figure 2:
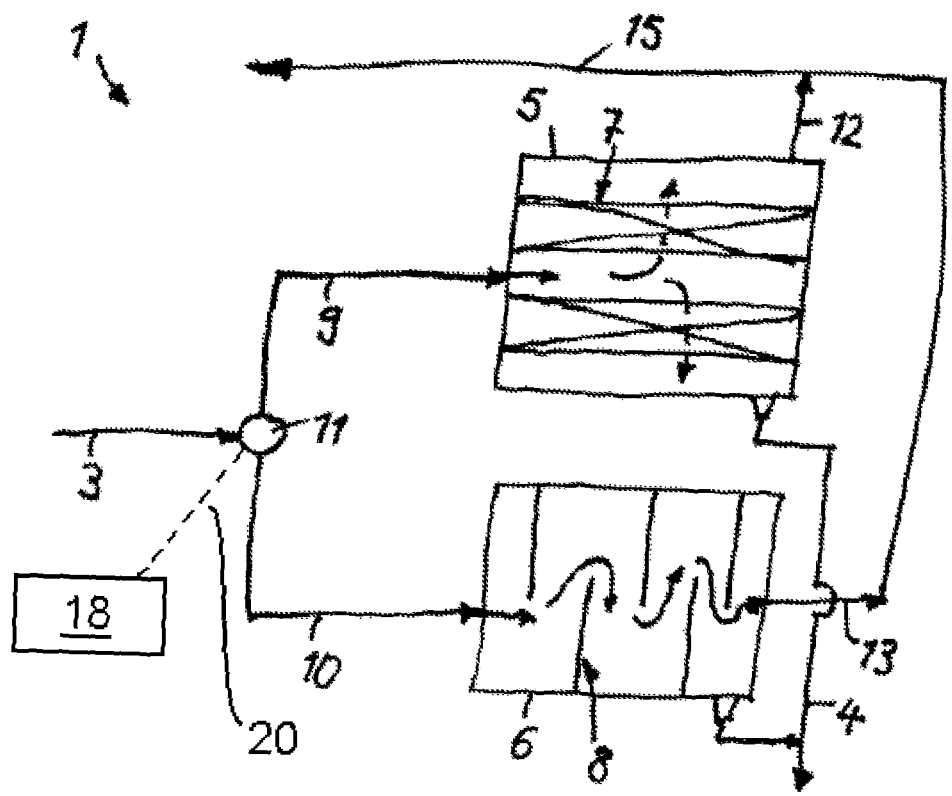
FIG. 2 an illustration of the oil separating device according to the invention with a filter element in a first flow path and a labyrinth separator in a second flow path arranged in parallel.

In FIG. 2 the oil separating device 1 is shown in an enlarged illustration. The separators 5 and 6 positioned in the flow paths 9 and 10 are differently constructed and designed particularly for filtration of different proportions of oil droplets and air in the blow-by gases. This enables by means of an appropriate position of the valve 11 a situation-appropriate filtration of blow-by gases so that, on the one hand, its separating efficiency is improved and, on the other hand, the service life of the separator elements 7 or 8 in the separators 5 and 6 is increased.

In the embodiment the separator element 7 in the first separator 5 is embodied as a filter element, in particular as a nonwoven filter fabric, that is flowed through by the blow-by gases introduced into the separator 5 radially from the interior to the exterior wherein, in the context of the invention, basically also a radial flow in the opposite direction or an axial flow is possible. The filter element 7 enables a fine filtration and thus a separation of very small oil particles from the oil/air mixture. The separated oil particles are collected in the separator 5 and are discharged through an oil discharge socket and returned through the return line 4 into the crankcase. The cleaned gases are removed through the conduit 12 from the separator 5 and introduced into a flow passage 15 that opens into the intake manifold of the internal combustion engine.

The second separator 6 is embodied as a mechanically acting labyrinth separator of a simple configuration whose separator element 8 is embodied as a labyrinth path with individual impact plates projecting into the flow path where the oil droplets of the blow-by gases are precipitated. The labyrinth separator is suited in particular for the separation of highly loaded blow-by gases with a greater oil proportion in the oil/air mixture. The separated oil particles are discharged through an oil discharge socket from the housing of the separator 6 and introduced into the return line 4. The cleaned gases are guided through the conduit 13 into the flow passage 15.

The valve 11 is embodied to be adjustable, for example, as a solenoid valve, and can be adjusted by means of governing or control signals 20 of a governing or control unit 18 as a function of various state variables or operating parameters or characteristics. For example, an adjustment as a function of the actual load state of the internal combustion engine is possible. Further parameters are the velocity of the vehicle or the engine or oil temperature.

The invention claimed is:

1. Oil separating device separating oil from a vented air/oil stream venting from the crankcase of an internal combustion engine, comprising:
    a first separator element operable to remove oil from an air/oil stream of a first flow path, said first separator including:
        an inlet receiving said air/oil stream;
        an cleaned air stream outlet; and
        wherein said first separator is embodied as a filter element; and
    a second separator element operable to remove oil from an air/oil stream of a second flow path, said second separator including:
        an inlet receiving said air/oil stream;
        an cleaned air stream outlet; and
        wherein said second separating element is embodied a mechanical separating element in which oil droplets in said air/oil stream are impacted on or accumulated on inner walls or plates of said second separator, said second separating element embodied as any of:
            a mechanically acting labyrinth having individual impact plates projecting into a flow path of said air/oil stream;
                wherein said oil droplets of said air/oil stream are precipitated on said impact plates;
            a cyclone separator; or
            an impact separator;
        wherein said second separator element is configured to separate oil from highly oil loaded blow-by gases of said air /oil stream;
    wherein the separator elements are connected to process the vented air/oil stream in parallel;
    wherein the vented oil/air stream to be cleaned is to be introduced selectively into the first flow path provided with the first separator element or into the second flow path provided with the second separator element;

wherein said vented air/oil stream from said crankcase flows through a common supply line which branches to divide said air/oil stream between said first flow path and said second flow path;

an adjustable valve arranged at said branch of said supply and is adjustable between a first and a second valve position to distribute said air/oil stream between said first and second flow paths;

wherein entire mass flow of said air/oil stream is introduced into said first separator element when said valve is in said first position;

wherein entire mass flow of said air/oil stream is introduced into said second separator element when said valve is in said second position;

wherein adjustment of said valve is realized by control signals from an engine governing unit or control unit;

wherein said valve is adjustable as a function of an actual state variable or operating parameter of the internal combustion engine or of a device of the internal combustion engine;

wherein said valve has an inlet connected to a supply line having said air/oil stream;

wherein said valve includes two outlets,
  a first outlet connected to deliver said air/oil stream to said first flow path and said first separator when said valve is in said first position; and
  a second outlet connected to deliver said air/oil stream to said second flow path when said valve is in said second position;

wherein said valve is adjustable as a function of an actual state variable or operating parameter of the internal combustion engine or of a device of the internal combustion engine.

2. Oil separating device according to claim 1, wherein
the first separator element comprises a non-woven fabric filter element; and
wherein said first separator element is configured to separate very small oil particles from said air/oil stream.

3. Oil separating device according to claim 2, wherein
the second separator element comprises either a cyclone separator or labyrinth separator; and
wherein said second separator element is configured to separate oil from highly oil loaded blow-by gases of said air /oil stream.

4. Oil separating device according to claim 1, wherein
wherein the governing unit or control unit adjusts the valve as a function of the actual operating load state of the internal combustion engine.

5. Oil separating device according to claim 4, wherein
said valve operates to direct said air/oil stream into said first flow path when said engine operates under a minimal first engine load; and
said valve operates to direct said air/oil stream into said second flow path when said engine operates under a higher engine load.

6. Oil separating device according to claim 1, wherein
said valve is operable in intermediate positions between said first and second valve positions;
wherein said valve is operable to divide mass flow of said air/oil stream or said supply into
  a first partial mass flow delivered to said first separator element; and
  a second partial mass flow delivered to said first separator element.

7. Oil separating device according to claim 1, wherein the valve is embodied as a solenoid valve.

8. Oil separating device according to one of claim 1, wherein
cleaned air outlets of said first and second separators connect into a common flow passage.

9. Oil separating device according to claim 1, further comprising:
an adjustable valve arranged at said branch of said supply and is operable to distribute said air/oil stream between said first and second flow paths.

10. Oil separating device according to claim 5, wherein
said valve is operable in intermediate positions between said first and second valve positions;
wherein said valve is operable to divide mass flow of said air/oil stream or said supply into
  a first partial mass flow delivered to said first separator element; and
  a second partial mass flow delivered to said first separator element.

* * * * *